No. 781,852. PATENTED FEB. 7, 1905.
J. C. TAYLOR.
NUT LOCK.
APPLICATION FILED JUNE 13, 1904.

WITNESSES:
T. L. McNabee
Wm. D. Hodges

INVENTOR
John C. Taylor
By
J. J. Weed
Attorney

No. 781,852.  
Patented February 7, 1905.

UNITED STATES PATENT OFFICE.

JOHN C. TAYLOR, OF DALLAS, TEXAS.

NUT-LOCK.

SPECIFICATION forming part of Letters Patent No. 781,852, dated February 7, 1905.

Application filed June 13, 1904. Serial No. 212,403.

*To all whom it may concern:*

Be it known that I, JOHN C. TAYLOR, a citizen of the United States, residing at Dallas, in the county of Dallas and State of Texas, have invented new and useful Improvements in Nut-Locks, of which the following is a specification.

This invention contemplates certain new and useful improvements in nut-locks, and relates more particularly to that class of such devices in which the locking means is carried by a washer mounted upon the bolt with which said nut coacts.

The invention has for its object the production of an improved nut-locking device by means of which the nut when once screwed home will be securely held against accidental reverse rotation.

A further object is to provide simple and efficient means whereby the nut may be readily unscrewed when desired.

The invention will be hereinafter fully set forth, and particularly pointed out in the claims.

Figure 1:
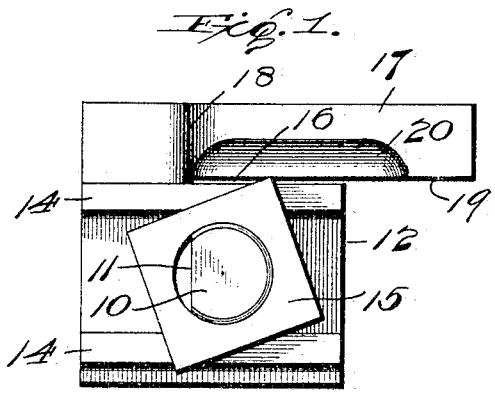
Figure 2:
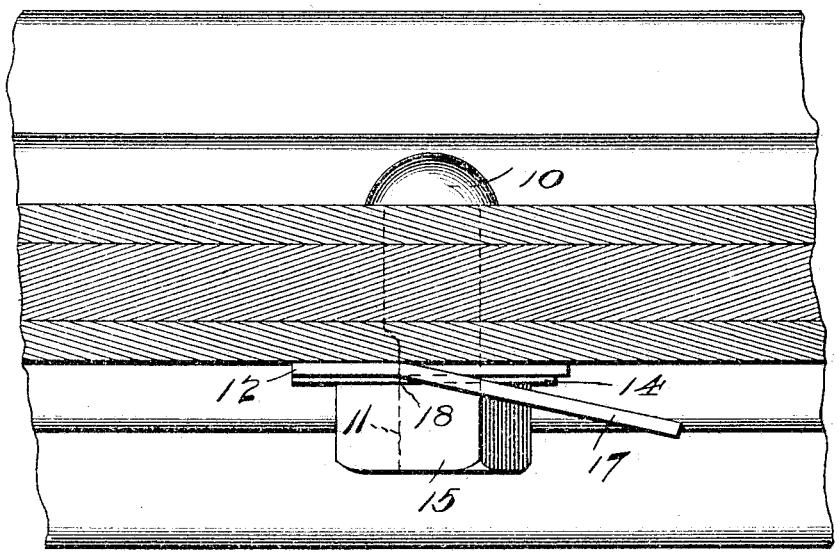
Figure 3:
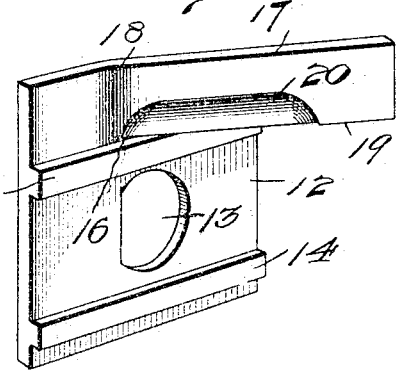

In the accompanying drawings, Figure 1 is an end view of a bolt with my improved nut-locking device mounted thereon. Fig. 2 is a sectional view of a rail with my invention applied thereto. Fig. 3 is a view in perspective, illustrating the nut-locking washer detached.

Referring to the drawings, 10 designates a threaded bolt having a portion of its thread removed to form a flat side 11. The locking device consists of a plate 12, having an opening 13, through which the bolt is to be passed, said opening being provided with a flattened side adapted to coact with the flat side of the bolt, whereby said plate is held from rotation. Said plate has its face provided with parallel ribs 14, against which the nut 15 is designed to bear when the same is screwed home. The upper portion of said plate 12 is split at 16 to form a locking-arm 17, which is bent forward from the point 18 to overhang the nut, said locking-arm being projected a considerable distance beyond the side edge of said plate, as indicated at 19. Said locking-arm is also concaved or hollowed at 20.

In practice the bolt is placed in position in the usual manner and the plate 12 then positioned thereon. As the nut is screwed home the same bears against the ribs 14, and by reason of the resiliency of the locking-arm 17 and the location of the concavity 20 thereof said nut will readily ride over said locking-arm. The latter, however, readily springs back as soon as each corner of the nut rides off the concave portion 20, thereby preventing the return of the nut in a reverse direction. When it is desired to unscrew the nut, it is only necessary to spring the arm 17 back by a suitable tool and hold it in this position, whereupon the nut may be readily turned off, this movement being aided by the concavity 20.

The advantages of my improved nut-lock will be readily apparent to those skilled in the art to which it appertains. It will be particularly observed that by prolonging the locking-arm a considerable distance beyond the side edge of the washer any tool employed to spring the same back will be out of the path of movement of a wrench or other tool acting on said nut and will not interfere therewith. It will also be observed that by providing the locking-arm with a concavity such as described the nut will readily ride over said arm, and yet sufficient surface is presented to engage said nut and prevent reverse rotation thereof through any accidental cause. It will also be noted that by raising the plane of the nut by means of the ribs 14 the locking-arm 17 can be disengaged from said nut by the exertion of a minimum force. It will also be observed that I may dispense with the flattened sides of the bolt and washer without departing from the spirit of my invention. A further advantage is obtained in the use of the ribs 14 in that there is less friction between the same and the nut than where the face of the nut abuts against the surface of the washer, whereby the nut can be turned more easily.

I claim as my invention—

1. A device of the character described, comprising a plate having an opening adapted to receive a bolt, said plate having its front face provided with a plurality of bearing-ribs, the upper edge of said plate being also provided with an overhanging spring locking-arm.

2. A device of the character described, comprising a plate having an opening adapted to receive a bolt, said plate being provided with an overhanging spring-arm having a concaved portion, said plate being also provided with a plurality of bearing-ribs.

3. A device of the character described, comprising a plate having its front face provided with a plurality of bearing-ribs, and a forwardly-bent spring-arm formed with said plate and provided with a concave portion, said arm extending beyond one side of said plate.

4. The combination with a bolt having a portion of its thread removed to form a flat side, of a plate having an opening adapted to receive said bolt, said opening having a flat side coacting with the flat side of said bolt, the front face of said plate being provided with a plurality of bearing-ribs, and an overhanging locking-arm formed with said plate and provided with a concaved portion.

In testimony whereof I have signed my name to this specification in the presence of two subscribing witnesses.

JOHN C TAYLOR.

Witnesses:
M. F. MINTER,
DAVID MURRAY